Dec. 8, 1964  J. T. FRYDRYK  3,160,080
APPARATUS FOR MAKING BOX-TYPE PRODUCT
Filed June 27, 1962  12 Sheets-Sheet 1
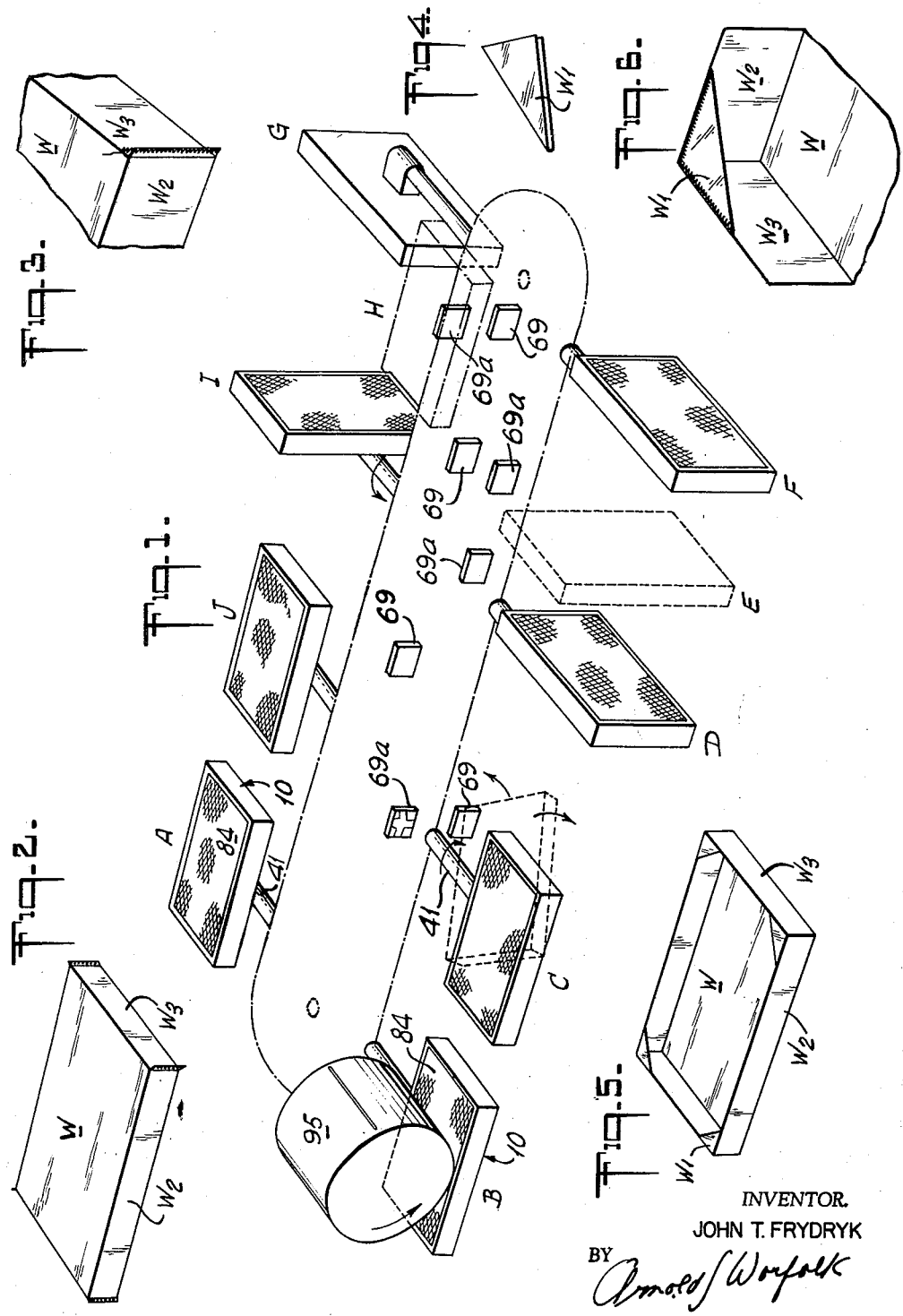
INVENTOR.
JOHN T. FRYDRYK
BY
ATTORNEY Dec. 8, 1964            J. T. FRYDRYK            3,160,080

APPARATUS FOR MAKING BOX-TYPE PRODUCT

Filed June 27, 1962            12 Sheets-Sheet 2

INVENTOR
JOHN T. FRYDRYK
BY
ATTORNEY

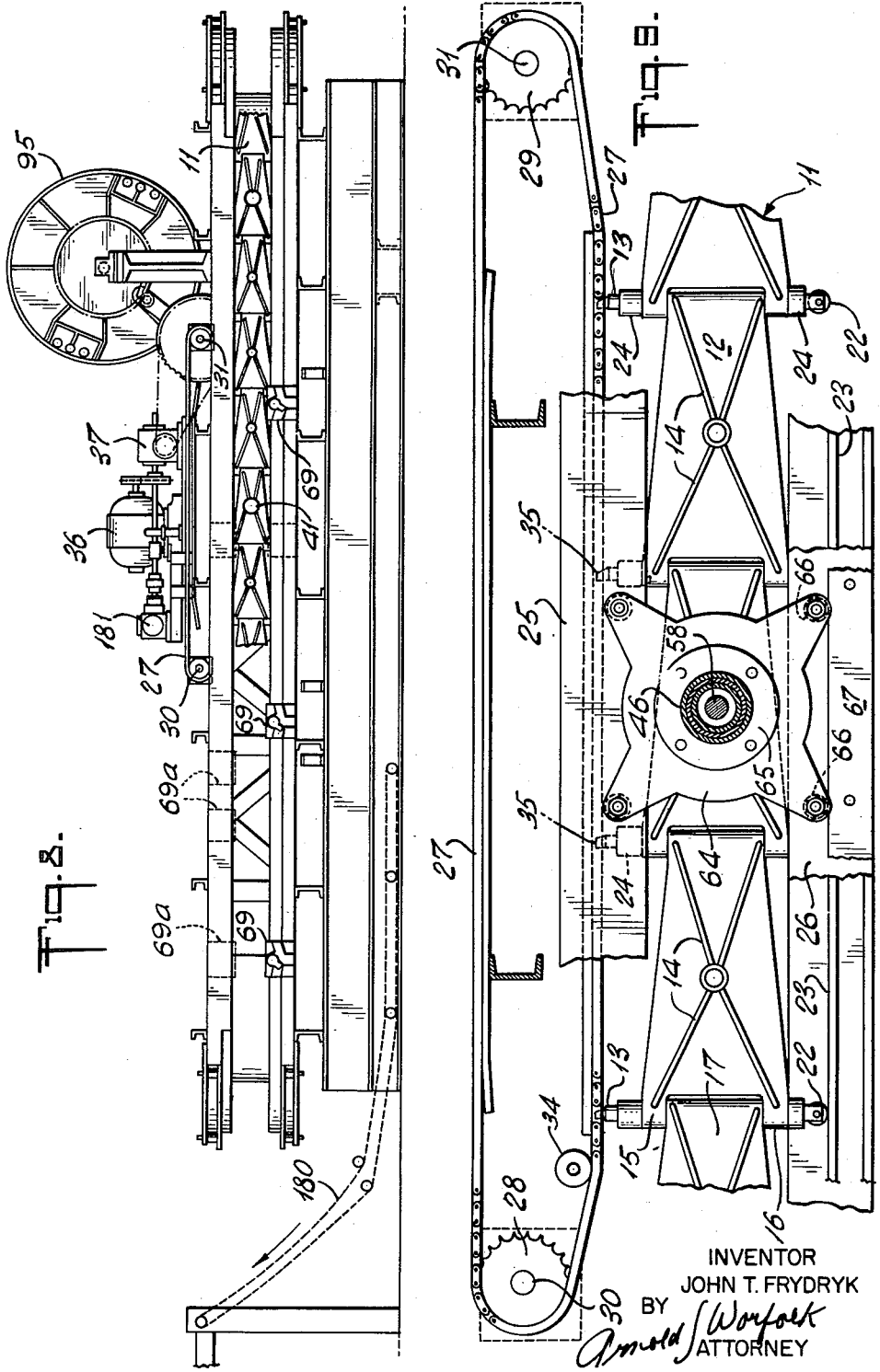

Dec. 8, 1964   J. T. FRYDRYK   3,160,080
APPARATUS FOR MAKING BOX-TYPE PRODUCT
Filed June 27, 1962   12 Sheets-Sheet 4

INVENTOR.
JOHN T. FRYDRYK
BY
ATTORNEY

Dec. 8, 1964  J. T. FRYDRYK  3,160,080
APPARATUS FOR MAKING BOX-TYPE PRODUCT
Filed June 27, 1962  12 Sheets—Sheet 5
Fig.12.
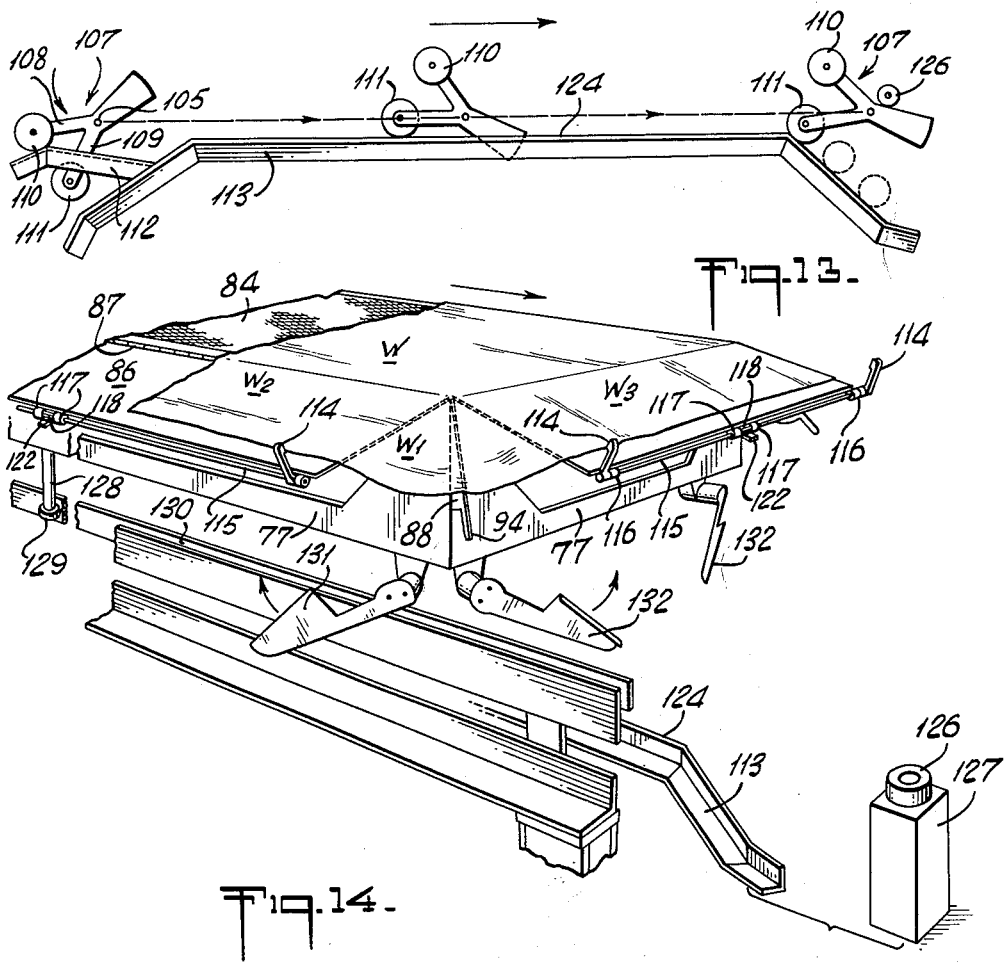
Fig.13.
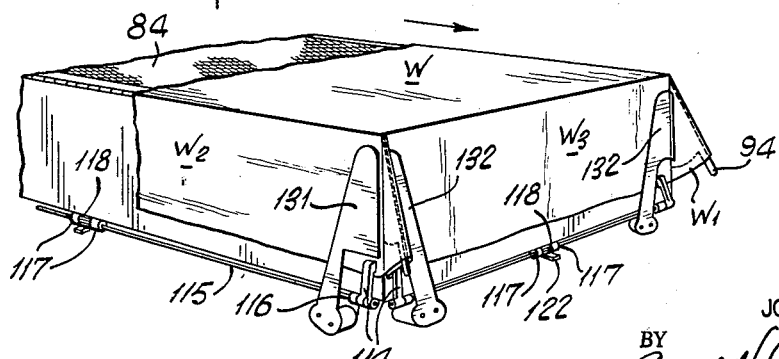
Fig.14.
INVENTOR.
JOHN T. FRYDRYK
BY Arnold Worfolk
ATTORNEY

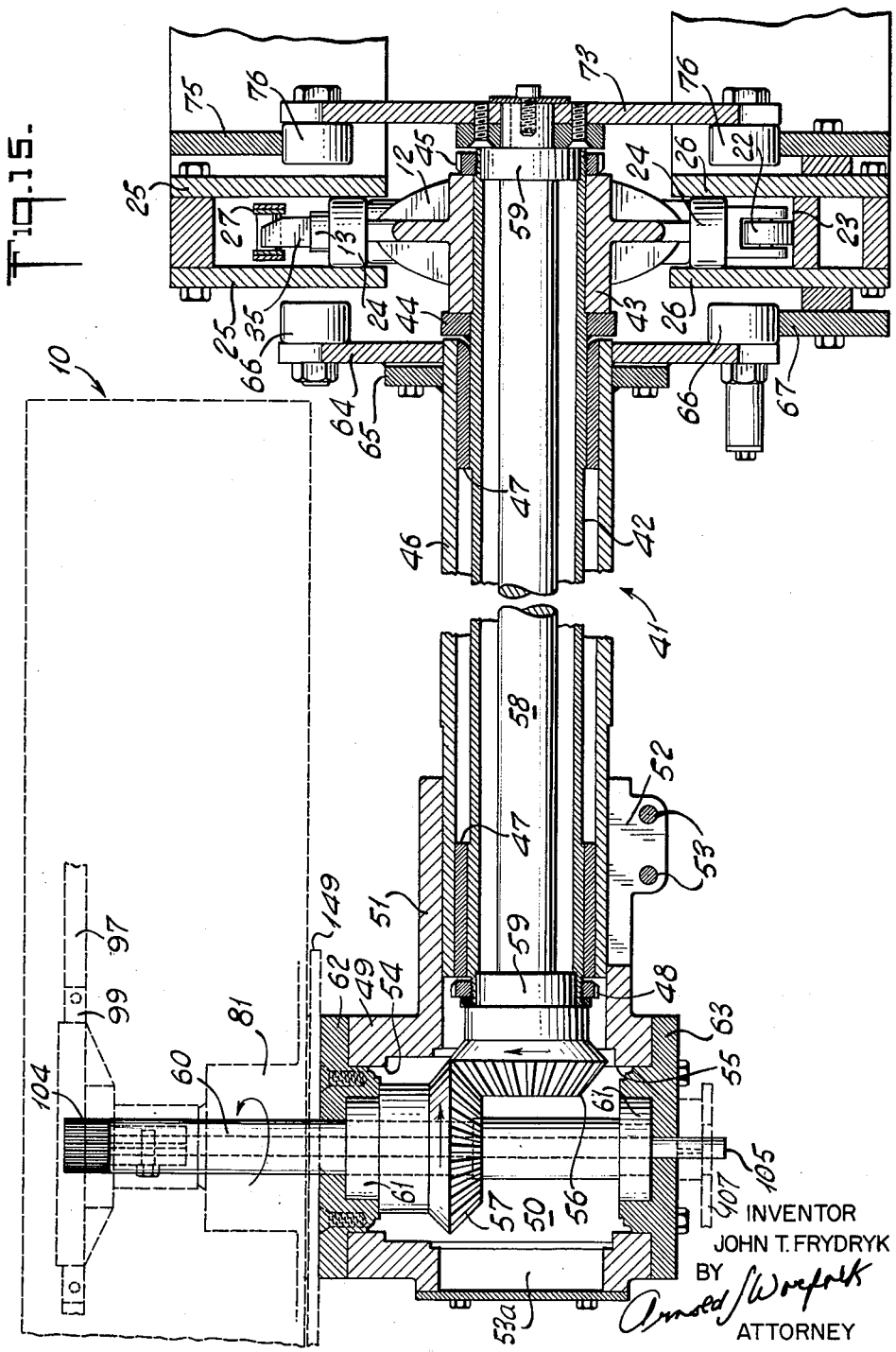

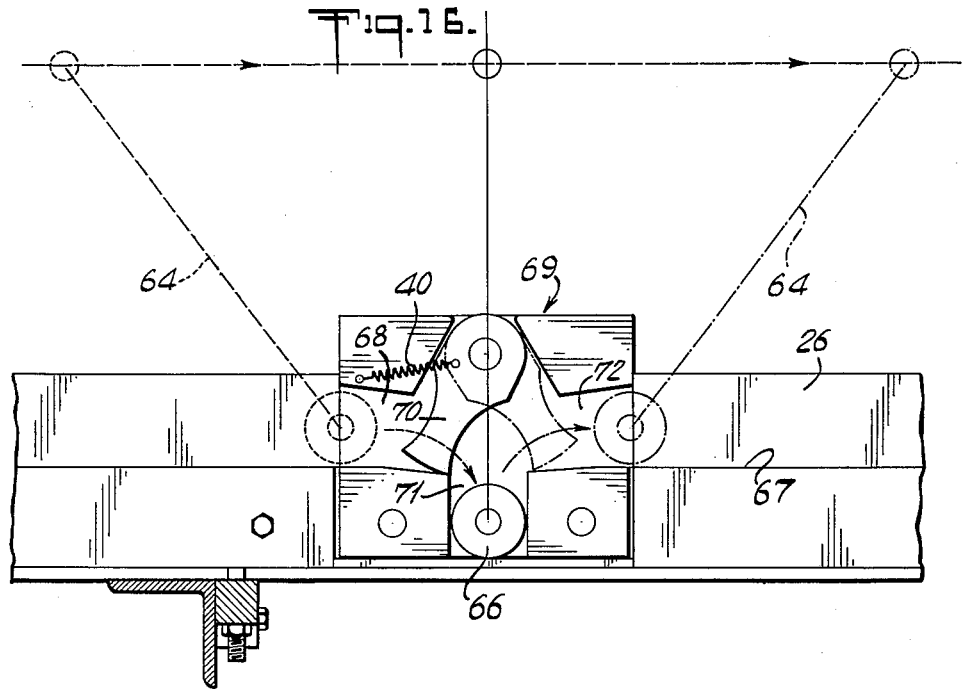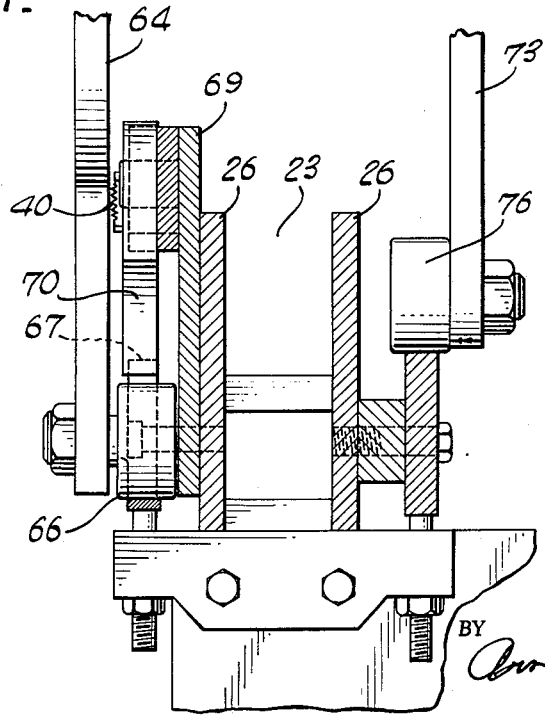

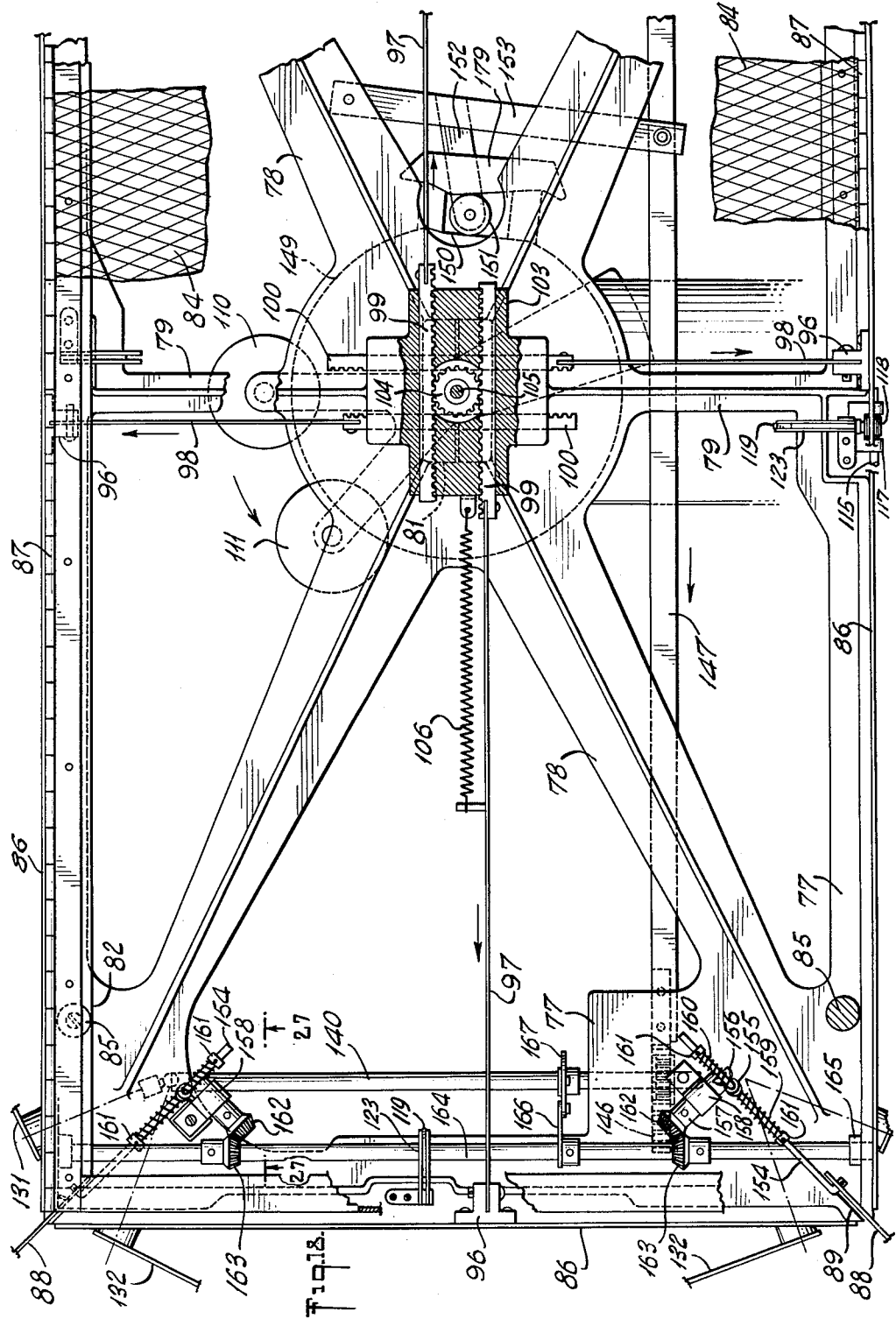

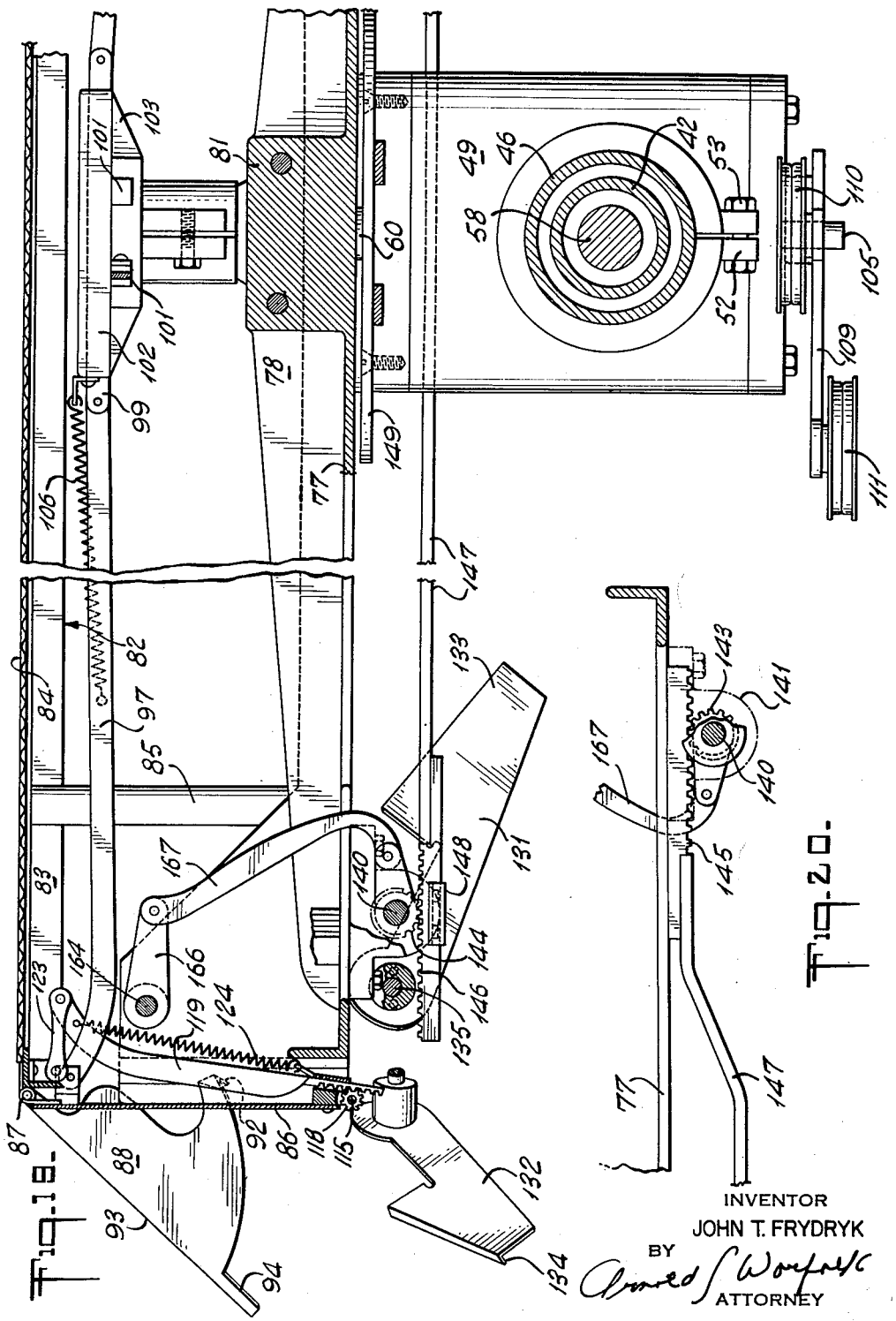

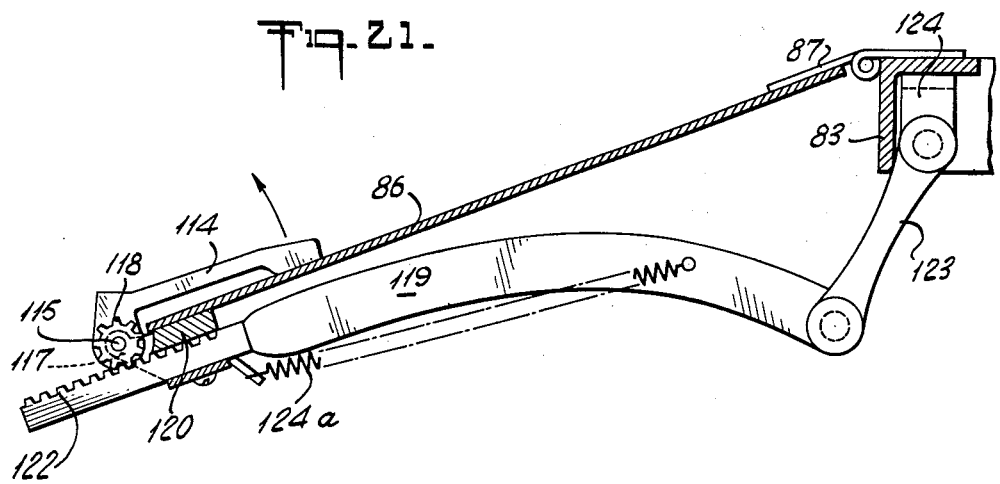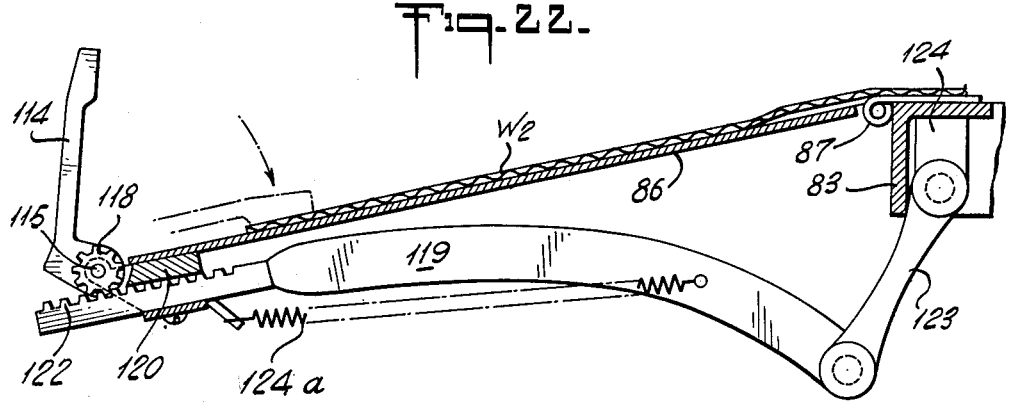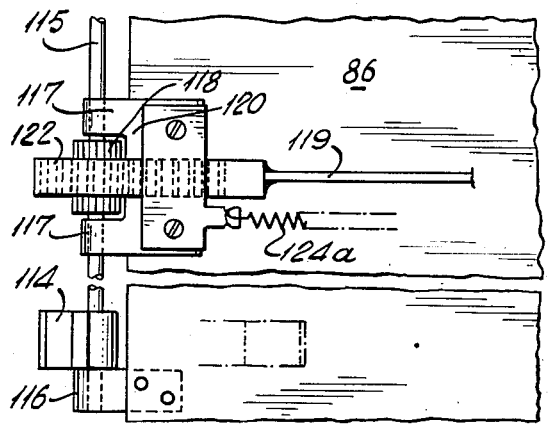
INVENTOR.
JOHN T. FRYDRYK
BY Arnold J. Woofolk
ATTORNEY

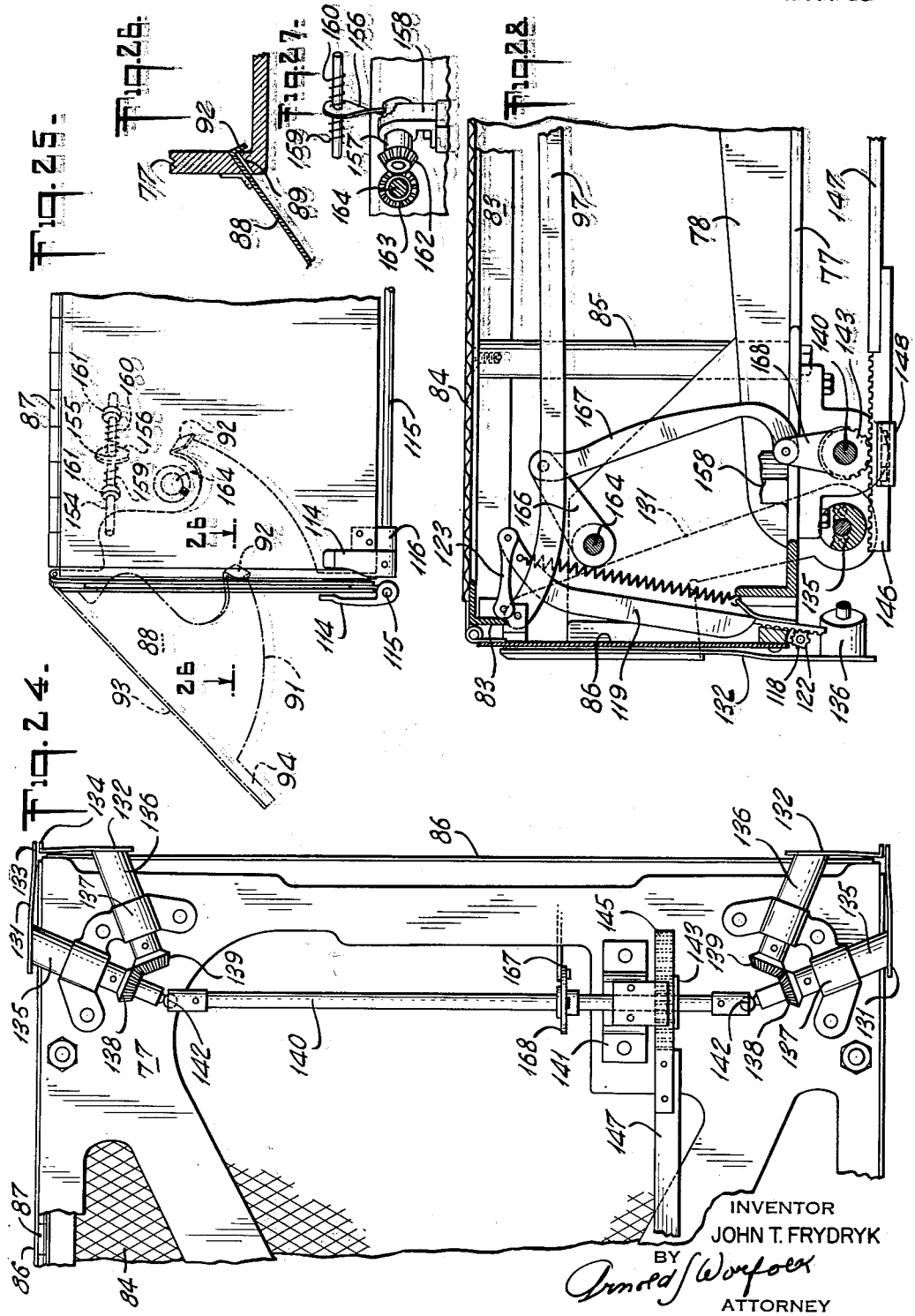

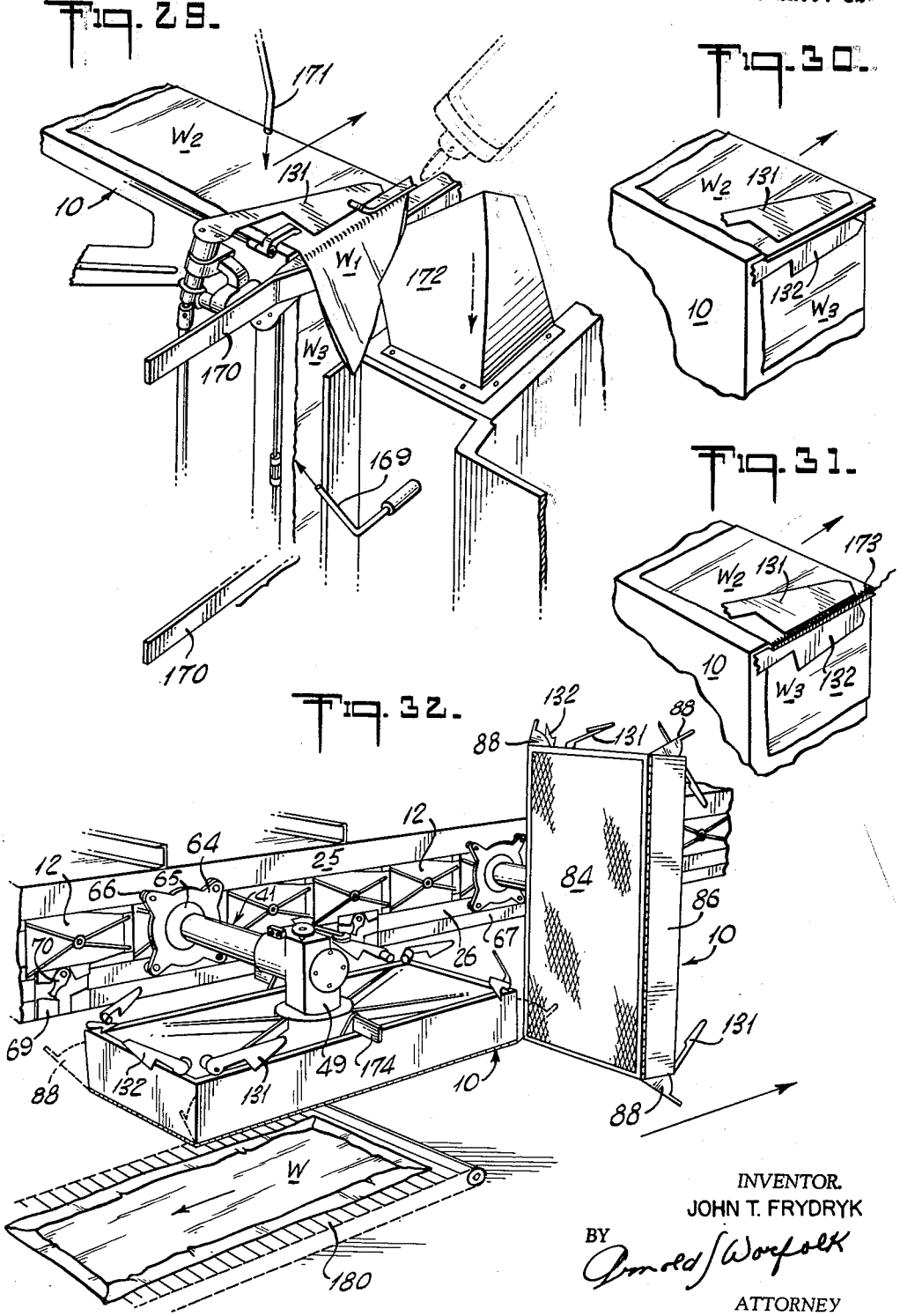

United States Patent Office 3,160,080
Patented Dec. 8, 1964

3,160,080
APPARATUS FOR MAKING BOX-TYPE PRODUCT
John Thomas Frydryk, Springfield, Mass., assignor, by mesne assignments, to Johnson & Johnson, New Brunswick, N.J., a corporation of New Jersey
Filed June 27, 1962, Ser. No. 205,684
11 Claims. (Cl. 93—44)

This invention relates to a method and machine for automatically making a rectangular box-like structure from a length of flexible sheet material and, more particularly, for making a fitted crib sheet from a length of flexible and limp woven sheeting.

The crib sheet to which reference is made is of the fitted variety having a base panel which rests upon and is coextensive with the mattress it is intended to cover and having marginal side and end panels folded down from the base panel to rest against and cover the side and ends of such mattress. The marginal side and end panels are sewed together where they meet at the corner edges of the mattress and preferably are interconnected by a triangular gusset sewed to such adjacent side and end panels at their lower edges immediately adjacent the junctures of said adjacent side and end panels. Thus, the fitted sheet for production by the method and machine with which the invention is concerned is one having mitered corners or pockets adapted to fit over the corners of the mattress on which it is used firmly to hold the crib sheet in place.

In the machine and method to which the present invention relates, a sheet material blank of appropriate size and which, by way of example, may be termed the crib sheet blank is deposited upon a frame having a flat top whose size and shape is the same as the size and shape of the mattress top for which the crib sheet is designed. The frame is equipped with flaps hinged at their upper edges along the top peripheral edges of the frame and, if the frame is designed to make a sheet with pockets at all four corners, there will be hinged flaps extending along both sides and along both ends of the frame. The flaps are equipped at their lower edges with fingers for holding the blank in place on the frame.

The flaps are moved to a raised position and the holding fingers to an inoperative position just prior to the deposition of a crib sheet blank on the frame. However, as soon as the blank is deposited on the frame, the fingers move to engage the blank near its edges so that the blank adjacent such edges is constrained to move with the flaps. The flaps then move downwardly to a lowered position at right angles to the top surface of the frame to fold the marginal side and end panels of the sheet downwardly into the position they ultimately will occupy with respect to the base panel in the finished crib sheet.

Operation of the flaps to a raised position is effected during movement of the frame into the position where it receives the crib sheet blank, and downwardly to their lower positions as the frame is moved out of such position after the crib sheet blank is deposited on the frame.

When the marginal lateral and end panels are folded downwardly to form the mitered corners, there remains at such corners an excess of material in the form of a square whose boundaries, on two sides, are the lines where the marginal side and end panels meet and, on the other two sides, those edge portions of the blank which continue beyond such lines of meeting to the corners of the blank in closest proximity thereto. These excess sections of material preferably are removed prior to sewing and to insure that they will extend outwardly away from the frame to facilitate such removal when the marginal side and end panels are folded downwardly, the frame is equipped at each corner with a tongue which, at its upper end, is hinged for pivotal movement from an extended position outside the frame to a retracted position inside the frame. The tongue possesses an edge which, in its normal extended position slopes outwardly away from the corner and downwardly from its hinge support but which, in the retracted position of the tongue, stands in a line of coincidence with the corner of the frame. The tongues at all corners of the frame are in their normal extended positions when the blank is deposited on the frame and when the flaps are lowered to fold the marginal side and end panels downwardly.

The frame, with the crib sheet blank held in place thereon, is moved to one station where the sheet is presented to a cutting device that shears off excess material simultaneously at two adjacent corners thereof and then to a station where the marginal side and end panels at the same two corners are sewed together. The frame then is rotated about a central axis perpendicular to its flat top through an angle of 180° and again presented to stations where the same operations of cutting and sewing are repeated on the sheet at the other end of the frame.

To make a crib sheet in the manner described, the improved machine, in accordance with the invention, has its frame mounted on a support carried by a conveyor which continuously travels in a closed path. The support presents a post on which the frame is fixed with its top surface perpendicular to the axis of the post about which the frame is rotatable. The post, in turn, is carried by a horiozntal arm about whose horizontal axis the frame is revolvable, i.e., the post extends radially from the axis of the arm and the frame revolves with the post about the axis of the arm when the arm is rotated. After the crib sheet blank has been deposited on the frame and its marginal side and end panels folded downwardly with the flaps, the frame arrives in its travel in a position where it is rotated through an angle of 90° to bring its lengthwise dimension in a direction extending tranversely to the path of movement imparted to the frame by the conveyor. The frame at such position is also simultaneously revolved through an angle of 90° about its supporting arm so that its top surface is now in a vertical plane facing in the direction of its travel. As the frame thus is rotateda, a pair of arms at each of its corners rotate upwardly from an inoperative position to an operative position in which the side and end panels of the fabric are clamped together along their lines of intersection. The tongues which, as previously stated, hold the excess corner portions of the sheet blank outwardly when the side and end panels are folded downwardly, are retracted at the same time as the clamping arms are moved to operative positions so as to leave such excess material loosely dangling ready to be sheared off. Further movement of the frame along its path of travel presents the folded crib sheet blank to a device for cutting off the dangling corners at the outboard end of the frame, and thereafter to sewing devices to sew the marginal side panels to the end panel at such outboard end.

The frame, by a further advance movement thereof, under the influence of the conveyor is rotated end for end so that what previously was the inboard end of the frame now becomes the outboard end and the sheet is similarly presented to devices for cutting off excess dangling corner material and to devices for sewing the marginal side panels to the end panel at such end.

Continued movement along its path or travel provides further rotation of the frame about its supporting post through an angle of 90° and revolution of the frame about its supporting arm through an angle of 90°. Such rotation brings the frame back to its initial position as regards rotation since it has now completed a full rotation of 360°. Revolution of the frame about its supporting arm, however, has proceeded only to the extent of 180° so that the top face of the frame which normally faces upwardly now faces downwardly. Since restoration of the frame to its initial position as regards rotation restores the fabric holding arms to their normal inactive positions, the completed crib sheet merely drops off the frame on to a suitable conveyor belt which carries it away for whatever further processing is desired.

Continued travel of the frame in its closed path causes it to revolve about its supporting arm another 180° thereby restoring it to its original position in which it is ready to receive a new crib sheet blank for repetition of the crib sheet making cycle.

A better understanding of the invention may be had from the following description read in connection with the accompanying drawings, wherein;

FIG. 1 is a perspective view illustrating diagrammatically various phases in the cycle of operation of a machine and method incorporating the present invention;

FIG. 2 is a perspective view illustrating a finished crib sheet turned inside out;

FIG. 3 is a perspective view, somewhat enlarged, of a corner of the crib sheet shown in FIG. 2;

FIG. 4 is a perspective view illustrating a portion of the crib sheet blank removed during the practice of the invention and which may be utilized in completing the manufacture of a finished crib sheet;

FIG. 5 is a perspective view of a finished crib sheet with the parts shown right side out and upside down;

FIG. 6 is a perspective view, somewhat enlarged, of a corner of the crib sheet shown in FIG. 5;

FIG. 8 is a side elevation of the machine shown in FIG. 7;

FIG. 9 is a side elevation on a somewhat larger scale of a part of the machine shown in FIG. 8;

FIG. 12 is a diagrammatic view illustrating various positions of a portion of the frame mechanism active in raising the frame flaps from normal position to raised position and back again;

FIG. 13 is a perspective view of a portion of the crib sheet frame with the parts shown in position to receive the crib sheet blank;

FIG. 14 is a perspective view of a portion of the crib sheet frame with the parts in the positions they occupy after the crib sheet blank has been deposited thereon and with the holding arms moved up to hold the sheet in place;

FIG. 15 is a longitudinal vertical sectional view through a frame supporting arm showing details of the operating parts;

FIG. 16 is a side elevation of a part of the machine operable in the movement of the frame into the various positions it assumes during its travel through the machine cycle;

FIG. 17 is a vertical sectional view of a part of the mechanism shown in FIG. 15 but with the parts in a different operative position;

FIG. 18 is a plan view of the crib sheet frame with the member presenting the top surface thereof partly removed to expose the parts located therebeneath;

FIG. 19 is a vertical longitudinal section through the crib sheet frame showing the operating mechanism at one end thereof;

FIG. 20 is a vertical longitudinal section through a part of the frame at the end opposite that shown in FIG. 19;

FIG. 21 is a vertical sectional view through a crib sheet frame flap in one position of adjustment;

FIG. 22 is a view similar to FIG. 21 but with the parts in a different position of adjustment;

FIG. 23 is a plan view of that part of the crib sheet frame shown in FIG. 21, looking at the parts from the bottom;

FIG. 24 is a plan view, looking at the parts from the bottom of one end of the crib sheet frame;

FIG. 25 is a partial side elevation of a corner of the crib sheet frame;

FIG. 26 is a fragmentary horizontal sectional view on line 26—26 of FIG. 25;

FIG. 27 is a vertical sectional view on line 27—27 of FIG. 18;

FIG. 28 is a longitudinal vertical sectional view through the crib sheet frame at one end thereof showing the parts in their active positions and with the corner tongue pieces retracted within the frame;

FIG. 29 is a perspective view of a portion of the crib sheet frame with the crib sheet blank located thereon in position as it approaches the trimming mechanism;

FIG. 30 is a perspective view of part of the mechanism shown in FIG. 29 after the trimming operation has taken place;

FIG. 31 is a perspective view of the parts shown in FIG. 30 but after the stitching operation has taken place; and FIG. 32 is a perspective view of a part of the machine showing the frame in its reversed top for bottom position just after the crib sheet, with sewing completed, has dropped off the frame.

Figure 7:
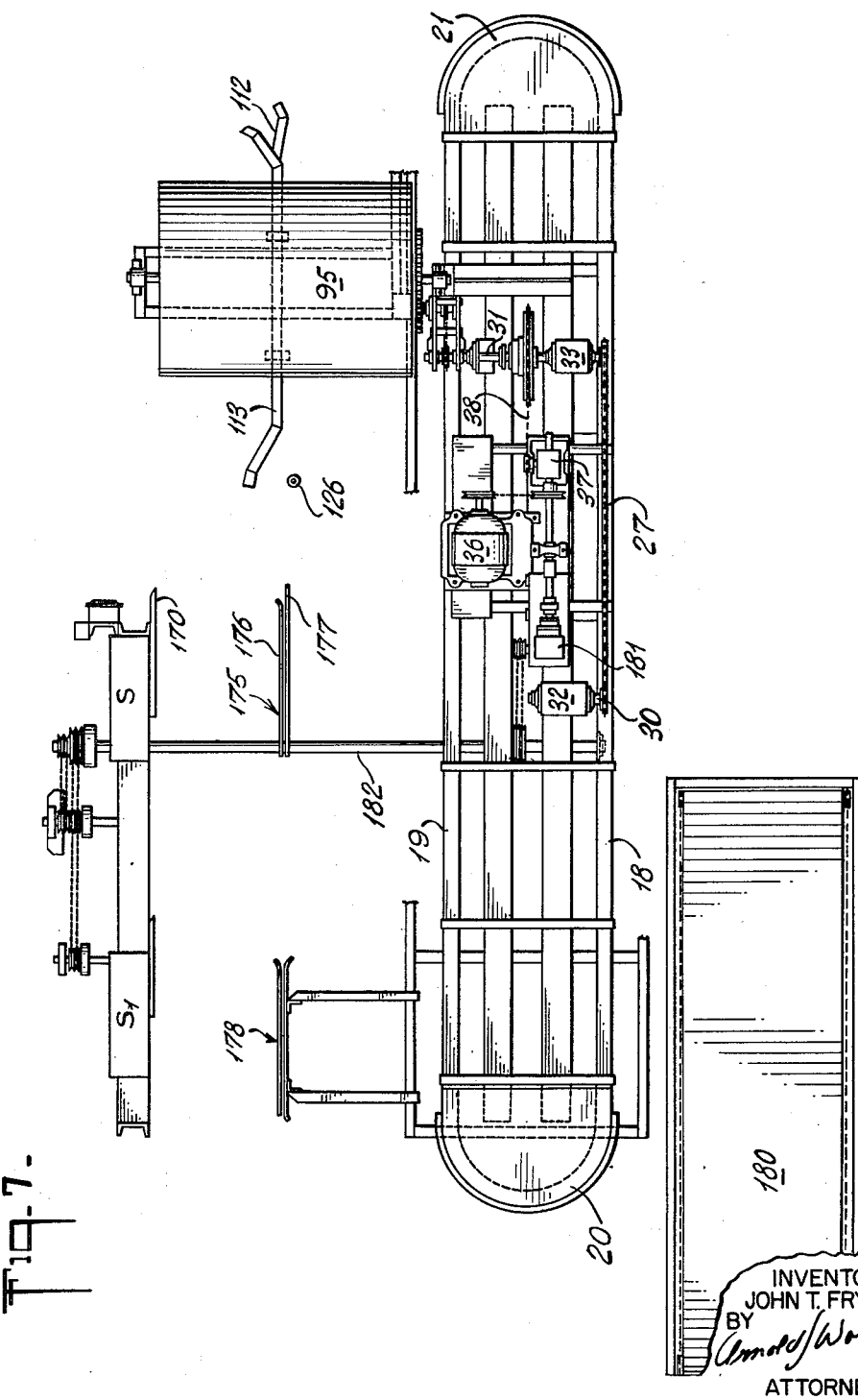
FIG. 7 is a plan view, partially diagrammatic, of a machine incorporating the present invention.

In the machine selected for illustrating the preferred embodiment of the invention, a plurality of the improved crib sheet forming frames 10 are carried by a traveling chain conveyor 11 having relatively massive links 12 articulated together by pins 13 (FIGS. 1, 8, and 9). The links have substantial length in their direction of travel and a somewhat lesser width in a direction at right angles thereto. The links may be suitably reinforced by diagonally disposed ribs 14 integral with the body portion of the link. The links taper from a greater width at one end to a narrower width at the other end, and at the wider end there is a pair of lugs 15, 16 spaced to accommodate between them a single lug 17 at the narrower end of an adjacent link; the lugs on both links being drilled to produce holes in vertical registry to accommodate the vertical pin which articulates them together.

Like the hinge pins 13, the conveyor links are vertically disposed, the conveyor of which they form a part being edgewise supported as it travels in a closed path consisting of two linear parallel sections 18, 19 with semicircular sections 20, 21 interconnecting them at their ends (FIGS. 7, 8, 9, and 15). The pins which articulate the links together are each provided at its lower end with a caster 22 which rides upon an elongated closed track 23 supported by the framework of the machine. Each pin also is equipped with antifriction rollers 24 located one above and the other below the upper and the lower link lugs respectively at the articulated joint and which in the travel of the conveyor are disposed between parallel guide plates 25, 26 fixed to the machine frame and located one pair of bars above and one pair below the conveyor. The guide plates by their cooperation with the antifriction rollers at the top and at the bottom of the links as the rollers travel between the guide plates, serve to maintain the links in a vertical position even though there are substantial forces tending to cant them out of such position as will presently appear.

The conveyor 11 is driven from an overhead chain 27 traveling between a drive and a driven sprocket 28, 29 in a direction of travel parallel to the linear traveling sections of the chain conveyor. The sprockets are fixed on transverse shafts 30, 31 journaled for rotation in bearings 32, 33 fixed on the machine frame. The lower flight of the chain 27 travels from the drive sprocket downwardly and below an idler 34 where the chain links at appropriate intervals engage the conveyor link pins 13 which at their top ends 35 are shaped in the form of sprocket teeth. While the chain at any time engages only a relatively few of the link pins (say four) and on one linear section only of the conveyor belt, such engagement nevertheless is sufficient continuously to drive the conveyor. Obviously as each conveyor pin arrives at the leading end of the lower flight of the chain, the sprocket tooth at the top thereof enters a chain link and accordingly is pulled forward by the chain until the sprocket leaves the chain at the trailing end of the lower flight. The chain is driven from a motor 36 supported on the machine frame at the top through appropriate speed reduction devices 37 and sprocket chain 38; a convenient speed of conveyor travel in the normal operation of the machine being approximately 35 feet per minute.

The conveyor is equipped with a plurality of improved crib sheet frames 10 but insofar as this invention is concerned only one need be considered. One frame for appropriate operation requires a minimum extent of conveyor travel. The conveyor length required for such travel will accommodate, however, a plurality of frames and a plurality of frames are accordingly used for economic reasons.

Each frame 10 is mounted on a support which includes a horizontally disposed arm 41 extending radially outwardly from the conveyor a distance such that a frame mounted at the end thereof has full clearance for rotation about its vertical center line (FIGS. 1, 9, and 15). The frame support includes a horizontal, hollow cylindrical sleeve 42 fixed at its inboard end on a conveyor link 12 appropriately designed for the purpose by presenting a large center section in the form of a hub 43 through which the sleeve extends. Endwise movement of the sleeve inwardly with respect to the link is limited by an annular flange 44 encircling the sleeve to which it is welded and whose inner surface bears against the outer surface of the hub section 43 on the link. Endwise movement of the sleeve outwardly with respect to the link is limited by a nut 45 threaded on the sleeve at its inner end and which presses up tightly against the inner face of the hub section on the link.

The frame support further includes an outer concentric sleeve 46 rotatably disposed on the supporting sleeve to which reference has just been made, by means of collars 47 fixed internally one at each end of the sleeve 46 and whose inner surfaces are machined for rotation on correspondingly machined raised portions of the fixed inner sleeve 42 supporting it. The outer rotatable sleeve 46 is held against any substantial axial movement along the inner supporting sleeve by a nut 48 threaded on the outboard end of the innner supporting sleeve 42 but which is so adjusted as to permit rotation of the outer sleeve without binding.

The outer rotatable sleeve 46 carries a gear box 49 at its outboard end formed with a relatively large gear containing cavity 50 and formed also with a cylindrical section 51 which encircles the rotatable sleeve, the cylindrical section being slitted longitudinally for a portion of its length so to facilitate a tightening adjustment of the slitted section with respect to the sleeve to prevent relative rotation (FIGS. 15 and 20). A pair of opposed lugs 52 fixed on the cylindrical section, one on each side of the slit therein, accommodates transversely extending bolts 53 which facilitate the tightening adjustment. The gear cavity has a cylindrical access opening 53a opposed to and in axial alignment with respect to the supporting arm 41, and two other circular access openings 54, 55 coaxially disposed on an axis which interesects the axis of the supporting arm at right angles thereto.

The gear cavity houses a pair of meshing bevel gears 56, 57, of which the gear 56 is fixed at the outboard end of a long shaft 58 coaxially disposed within and for relative rotation with respect to the hollow supporting arm 42 (FIG. 15). The shaft 58 is supported near its opposite ends for rotation in roller bearings 59 recessed into the inner wall of the supporting arm in the vicinity of its threaded end sections. The access opening 53a of the gear cavity 50 is large enough to accommodate passage of the bevel gear 56 therethrough when the parts are assembled, and it may be appropriately closed after assembly of the parts. The second beveled gear 57 meshing with the first is fixed on a shaft or post 60 which in the normal position of the parts is vertically disposed and whose axis is at right angles to and intersects with the axis of the shaft 58 on which the first beveled gear 56 is mounted. The normally vertically disposed post 60 is mounted for rotation in a pair of spaced roller bearings 61 recessed one into the underside of a plate 62 which closes the gear cavity at the top and the other of which is recessed into the top side of a somewhat similar plate 63 which closes the gear cavity at the bottom. The post 60 whose rotation is effected by its bevel gear connection with the horizontal gear shaft 58, supports a crib sheet frame 10 at its upper end in a manner which is hereinafter described. From what has been said thus far, it is clear that when the outer sleeve 46 rotates in a clockwise direction looking at the outboard end of the supporting arm (i.e., the left as shown in FIG. 15), the frame 10 will revolve in a clockwise direction around the supporting arm whereas when the gear shaft 58 rotates in a counter-clockwise direction within the supporting arm, the frame 10 will rotate in a counter-clockwise direction looking at the parts (in their normal positions) from the top.

Rotation of the outer sleeve 46 and of the inner shaft 58 are effected by devices which have been disclosed and claimed in my copending application Serial No. 792,741, for Automatic Machine and Method, in which a full description thereof appears. Briefly, the device for rotating the outer sleeve comprises a four pointed star plate 64 disposed concentrically with respect to the rotatable sleeve 46 to which the star plate is fixed by means of a concentric annular flange 65 welded externally to the sleeve (FIGS. 8, 9, 16, and 17). Each leg or point of the star plate supports an antifriction roller 66 any adjacent two of which, during conveyor travel, track along an underlying horizontal rail 67 fixed to the framework of the machine parallel with and just externally of the lower guideway 23 for the conveyor hinge pins. At designated intervals and when appropriate, as will be hereinafter described, the leading antifriction roller in engagement with the rail encounters a first upper arm 68 of a Y-slot 69 which normally stands closed by a pivotally mounted dog 70. However, the dog 70 yields against the tension of spring 40 which normally holds it in the slot closing position as it is engaged by the antifriction roller 66 and is moved to a position in which it directs said roller into a downwardly extending vertical portion 71 of the Y-slot (the dotted line position in FIG. 16). When the antifriction roller 66 is thus located in the vertical portion 71 of the Y-slot, its forward movement is arrested. The roller 66 acts as a pivot about which the star plate, as the conveyor advances, rotates in a clockwise direction until the antifriction roller next around the star plate engages the track 67 on which the rollers are supported. The antifriction roller 66 which initially entered the Y-slot 69 to effect the rotation of the star plate descends to a position below the dog 70 (the solid line position in FIG. 16) which thus, under spring tension, swings back to its normal position wherein its trailing edge now directs the antifriction roller out of a second upper arm 72 of the Y-slot as the conveyor proceeds on its way. Such rotation of the star plate and consequently the external sleeve 46 to which it is attached will cause the frame 10 to revolve about its arm support 41 through an angle of 90°.

Rotation of the internally mounted gear shaft 58 is effected by a star plate 73 which is fixed on the inboard end of such shaft in a plane parallel to the star plate 64 which effects the rotation of the outer sleeve 46. This star plate is substantially the same as the one just described except that its associated Y-slots 74 are inverted and are presented in an overlying rail 75 fixed on the machine frame instead of in an underlying rail. The entry of a leading antifriction roller 76 at the top into an inverted overlying Y-slot 74 will interrupt the advance movement of such antifriction roller so that continued advance movement of the conveyor will rotate this star plate 73 in a counter-clockwise direction through an angle of 90°. The associated crib sheet frame 10 will also rotate about the axis of the post on which it is mounted for 90° in a counter-clockwise direction through the connections previously described.

The crib sheet frame 10 on which the crib sheet is formed includes generally a rectangularly shaped base member 77 preferably of cast aluminum which is reinforced at the bottom with relatively heavy diagonal struts 78 as well as by somewhat lighter transverse struts 79 located midway between the ends of the frame (FIGS. 18 and 19). The members around the peripheral bottom of the frame have generally an angle shape cross section except at the corners where side and end sections 80 extend upwardly for about three-quarters of the frame's height. A relatively heavy center section 81 of the base casting is drilled to accommodate the post 60 on which the frame is mounted, and the section is split vertically and longitudinally, the split sections being transversely drilled and threaded to receive machine screws whose tightening will exert a binding action on the post to secure the frame in place.

The frame 10 is further provided with a top frame section 82 which is parallel to and generally of the same rectangular shape as the base frame member. The frame top includes angle shaped sections 83 along its peripheral edges with one leg directed downwardly and the other leg horizontally and inwardly, the horizontal legs being beveled at the corners so that the top surfaces of the peripheral frame members are coplanar throughout. A perforated plate or screen-like member 84 spans the entire area of the frame defined by the peripheral frame members.

Figure 10:
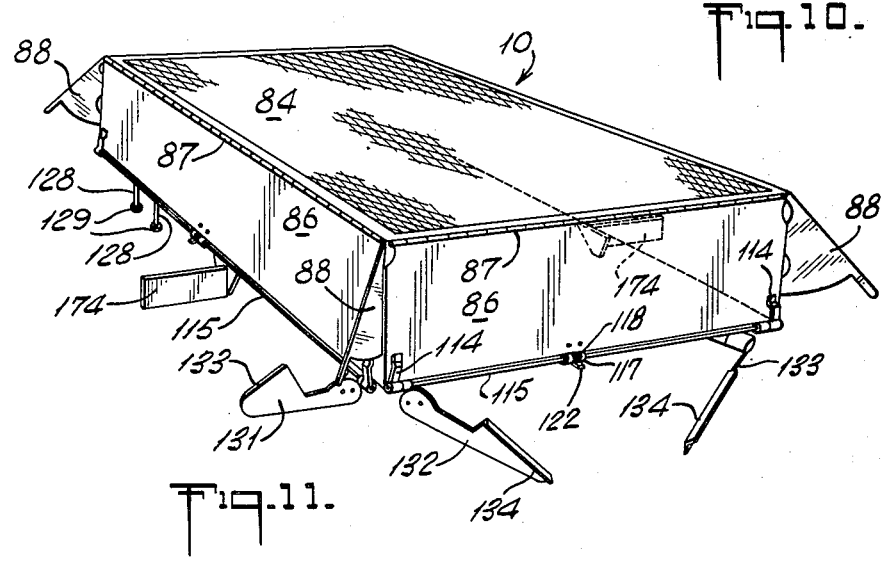
FIG. 10 is a perspective view of a crib sheet frame used in the improved machine with all of its parts shown in their normal positions.

The top frame section 82 is fixed to and is supported on the base casting by vertical struts or posts 85 secured to the base frame near each corner thereof (FIGS. 18, 19, 24, and 28). The frame 10 at its sides and ends is closed entirely by flaps 86 which, at their upper edges, are hinged to the peripheral frame angle sections 83 of the top section as by piano hinges 87 (see also FIG. 10). One leg of each hinge is secured to the adjacent angle section 83 of the top and the other leg to the associated flap 86 on its inner surface and near its upper edge. In the normal position of the parts, these flaps extend vertically downwardly where they rest near their lower edges against the base casting. A part which, for want of a better name, may be termed a tongue 88, is pivotally mounted at its upper end, one at each of the corners of the frame (FIGS. 10, 18, and 25). Each tongue comprises a relatively thin plate section adapted to be swung about its pivot through a slot 89 provided for the purpose at the corner of the base casting (see also FIG. 26). The plate is of generally triangular shape except where its inner edge 90 is cut away to clear some of the frame parts during its movement, as will be pointed out hereinafter, and except also that its lower edge 91 is formed on a radius to accommodate the length of the slot through which it passes as it pivots from one position to another. In the normal position of the parts, each tongue 88 extends outwardly to a position as determined by an ear 92 bent up from the tongue at its inner edge and that engages the base casting at the inner side thereof; and, when the tongue is in its normal outermost position, its opposite faces are disposed at an angle of 135° with the adjacent side and end flaps when the latter are in their lowered position. Also, when a tongue is in its extended position, its outer edge 93, which is straight, is disposed approximately 45° with the top surface of the frame. When a tongue is retracted to its innermost position, which is determined by the engagement with the base casting of a downwardly extending portion 94 of the tongue near its front edge, such outer edge of the tongue will rest flush with the corner of the frame. The manner in which the tongues are extended and retracted will be made clear as the description of the invention proceeds. Suffice it to say here, in the normal position of the parts, the tongues are held extended under spring tension, the flaps are located in their lowered position, the top of the frame faces upwardly and its lengthwise dimension is in the direction of movement imparted to it by the conveyor device (FIG. 10). The crib sheet frame contains other devices and parts whose function and operation will be made clear later on.

Figure 11:
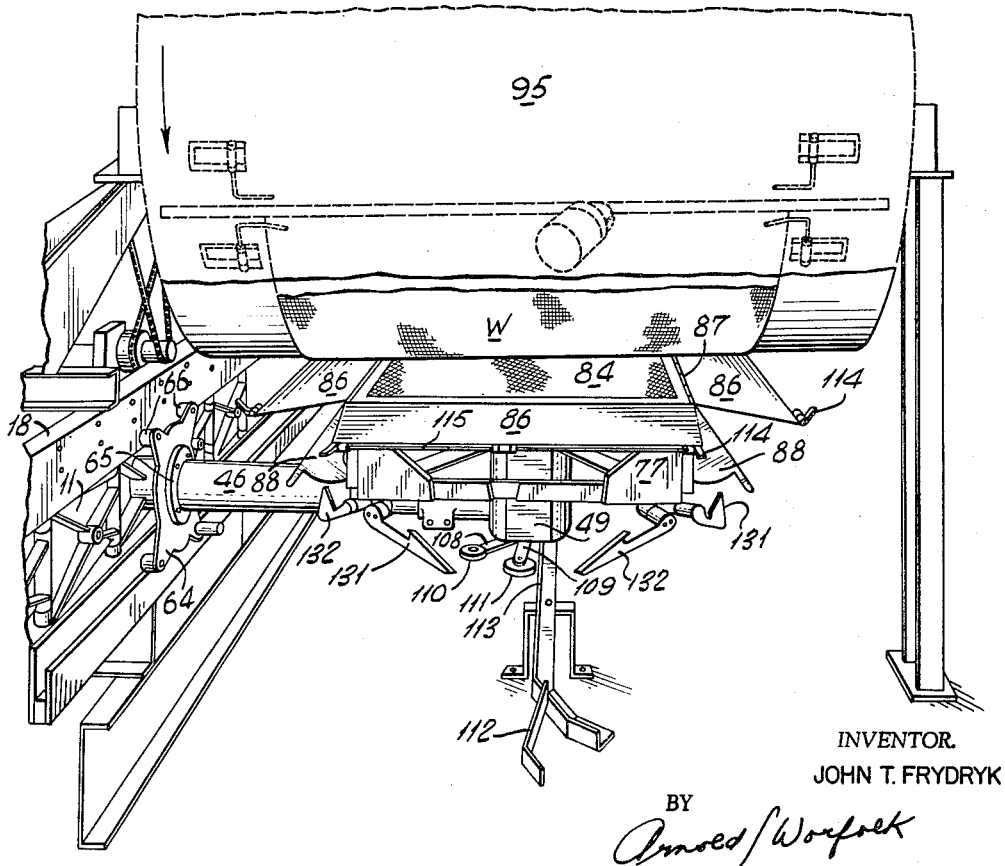
FIG. 11 is a perspective view of the frame shown in FIG. 10, but in position and condition for receiving a crib sheet blank.

When a crib sheet frame 10 reaches a position A during the movement of the conveyor device, all of the frame parts are in normal position (FIG. 1). From there, the frame travels around the end of the machine until it arrives at a position B beneath a cylindrical drum 95 axially disposed transversely to the direction of travel of the frame and from which a blank of fabric W for the crib sheet is deposited upon it (FIGS. 11 and 13). The crib sheet blank is rectangular in shape with a length equivalent to the length of the frame plus not quite twice the width of an end flap, and a width equivalent to the width of the frame plus not quite twice the width of a side flap.

The details of construction of the drum from which the crib sheet blanks are deposited on the frame have no concern with the present invention and, accordingly, need not be described in detail. A drum suitable for the purpose, however, is fully described in copending application S. N. 792,741 previously referred to.

As the crib sheet frame 10 moves into position B below the drum 95 ready to receive the blank, the side flaps and the end flaps 86 are turned up to their raised positions (FIGS. 11, 13, 18, and 19). To this end, each flap 86 is equipped with a bifurcated lug 96 fixed on its inner face near the top and about midway of its length. To each lug there is connected for pivotal movement between its bifurcations, a long link 97, 98 which extends inwardly toward the center of the frame. The links are located just below the top of the frame and those, the links 97, which are connected to end flaps extend parallel with the lateral edges of the frame, whereas those, the links 98, which are connected to side flaps extend parallel with the end edges of the frame. Each link at its inner end presents a horizontally disposed toothed rack bar 99, 100 which, in effect, is a continuation of the link except that the links and racks are connected together for pivotal movement to accommodate a slight swinging movement of the links as is required in the raising and lowering of the flaps. The racks 99, 100 are arranged for sliding movement in guideways 101, 102 formed in a casting 103 located just above the center hub portion of the base casting and which is clamped to the supporting post 60 about whose axis the crib sheet frame rotates during operation of the machine (FIGS. 15 and 18). The guideways 102 for the racks 99, connected with the end flaps, are located just above the guideways 101 for the racks 100 connected with the side flaps. The teeth of the racks 99 associated with the end flaps engage opposite sides of a pinion 104 fixed at the upper end of a rod 105 which extends downwardly through the post 60 that supports the crib sheet frame and is rotatable with respect to such supporting post. The teeth of the racks 100 associated with the side flaps 86 engage opposite sides of the same pinion but at a level immediately below. The arrangement is such that when the pinion 104 is rotated in one direction, say clockwise looking at the parts from the top, the racks 99, 100 are moved to force the flaps outwardly and upwardly to their raised positions, whereas when the pinion is rotated in the opposite direction, the flaps are moved to their lowermost positions wherein they engage the base casting of the frame. Movement of the flaps to their outermost or raised positions is against the tension of a spring 106 secured at one end to a pin fixed in one of the links 97 and is anchored at its other end in the casting 103 at the center of the frame. Since the spring 106 through its associated rack 99 acts through the pinion 104, it will of course be effective on all flaps, with the result that close control of the movement of the flaps 86 may be effected by controlling the rotation of the pinion 104 through which the flaps are operated.

As previously stated, the pinion 104 is fixed at the top of the vertical shaft 105 which is rotatably arranged in the post 60 on which the frame is carried. The shaft 105 emerges at its lowered end below the pivotal gear housing 50 and extends a distance sufficient to accommodate a crank arm 107 having arms 108, 109 radiating from the shaft on which they are mounted and which are equipped each at its outer end with a cam follower 110, 111 (FIGS. 11, 12, 15, and 19). Each cam follower is arranged to rotate in a horizontal plane located one above and the other below the arms on which they are carried so that each may engage an independent cam track 112, 113. As the crib sheet frame 10 moves into position to receive the fabric blank W from the overhead drum 95, but before the blank is deposited thereon, the cam followers 110, 111 engage the cam tracks 112, 113 located one track for cooperation with the upper cam follower and the other track for cooperation with the lower cam follower, but which function to rotate the shaft 105 on which the followers are mounted, in a direction to raise all of the flaps 86 to their uppermost positions, ready for deposit of the fabric blank thereon.

At this point it should be stated that adjacent each end of each flap 86 and at the lower edge thereof, there is mounted a finger 114 whose function will presently appear (FIGS. 10, 13, 21, 22, and 23). The fingers 114 associated with each flap are fixed at the opposite ends of a rod 115 rotatably disposed in lugs 116, 117 fixed on such flap at its lower edge. There are preferably four of such lugs on each flap located one (a lug 116) immediately adjacent each of the fingers and the other two (the lugs 117) about midway between the ends of the flap in a spaced relation sufficient to accommodate a small pinion 118 between them which is fixed on the rod 115. A link 119 which is constrained at its lower end for movement in a guideway 120 formed in a block 121 which presents the center lugs 117 is formed with rack teeth 122 for cooperation with the pinion 118. The link 119 at its upper end is pivotally connected to a short link 123 at one end which in turn is pivotally connected at its opposite end in a bracket 124 depending from the peripheral frame member 83 at the top of the crib sheet frame. A tension spring 124a secured at one end near the top of the first mentioned link is anchored at its other end to the block 120 which serves to guide said link in its sliding movement. The tension spring 124a urges the bar downwardly and this in turn tends to rotate the pinion 118 and consequently the rod 115 which carries the fingers in a direction to urge the fingers toward the adjacent outer face of their associated flap. The normal position of the fingers incidentally is determined by their engagement with the outer face of the flaps. When the flaps are moved toward their raised positions in the manner previously described, the links 119 swing upwardly with the flaps initially without any relative adjustment between them for so long as the short link 123 near the top edge of the flap is free to pivot about its connection 124 with the top frame member. However, as each flap approaches the upper limit of its movement, i.e., its raised position, the short link engages the lower edge of the adjacent top frame member which arrests its further pivotal movement (FIG. 21). When this occurs, the location of the pivotal connection between the short link 123 and the rack bar link 119 becomes fixed so that continued movement of the flap 86 upwardly effects relative movement outwardly of the flap at its lower edge with respect to the rack teeth 122. This relative movement turns the pinion 118 which meshes with the rack and consequently the bar on which it is mounted in a direction to swing the fingers to an open position away from the outer surface of the flap (FIG. 22).

These various movements of the flaps and their associated fingers will have occurred when the rollers 110, 111 on the crank arms 108, 109 which control the movement of the flaps have arrived in engagement with a long straight edge of the cam bar 113 which is parallel with the direction of linear motion of the crib sheet frame 10 imparted to it by the chain conveyor. So long as the rollers continue in engagement with such straight edge, the flaps 86 and the fingers 114 continue in their raised and their open positions, respectively. During the period that the flaps and the fingers are in such positions, a fabric blank W from which the crib sheet is to be made is deposited on the crib sheet frame, its size and shape, as previously stated, being such that its edges at the sides and at the ends terminate somewhat short of the adjacent outer edges of the flaps 86 on the frame (FIG. 13).

When the lower cam follower 111 reaches the end of the long straight edge portion of the cam bar 113, a condition which occurs after the crib sheet blank has been appropriately deposited on the frame, it encounters a surface portion 125 of the cam bar which angles away from the frame's line of movement in an outward direction and which permits rotation of the lower cam follower 111 in a direction to effect lowering of the flaps 86. The spring 106 pulling inwardly on the bar 97 associated with one of the end flaps, through the rack and pinion connection, causes such rotation of the lower cam follower, but to insure that the flaps are positively lowered, the cam roller 111 and consequently the pinion shaft 105 which carries it, is turned back positively as the inner edge of the arm 107 carrying the cam followers engages a roller 126 rotatably disposed at the top of a vertical post 127 fixed in the floor and which stands in the path of such arm as the frame moves along its path. As the arm 107 carrying the cam followers turns back to its normal position, the motion of the flaps 86 and of their associated fingers 114, as previously described, now occurs in the reverse order, i.e., the fingers during the initial movement of the flaps are restored to their normal positions where they now engage the crib sheet blank near the lower edge thereof (the dotted line position in FIG. 22), with the result that portions of such blank are held in contact with the outer surfaces of the flaps (FIG. 14). At each corner of the frame and between the end edges of adjacent side and end flaps, there will be a gusset of material W–1 which remains extending outwardly by virtue of the fact that the tongues 88 at the corners of the frame remain in their extended position until after the flaps 86 have been completely restored to their normal positions at right angles to the top of the crib sheet frame, complete restoration of parts having been completed when the lower cam follower 111 has ridden off the cam bar 113. The frame 10 is steadied against turning about the axis of its supporting post 66 as it travels beneath the blank delivering cylinder 95 by a pair of posts 128 fixed to and which depend from the frame. The posts 128 are located at the outboard side of the frame as it travels below the cylinder, are spaced in a longitudinal direction along the frame and are equipped at their lower ends with rollers 129 which track in a fixed longitudinal guideway 130 disposed adjacent the cam bar 113 (FIGS. 10 and 13).

At this point in the operation of the machine's cycle, the frame 10, with the blank W thereon, is located with its top facing upwardly and with its lengthwise dimension parallel to the direction of the conveyor's linear travel. With the frame so disposed, the star plates 64 and 73 which control rotation of the frame about its supporting post 69 and revolution of the frame about its supporting arm 41, encounter Y-slots 69, 69a, of the type previously described, located one outside and below and the other inside and above (FIGS. 1, 16, and 17), which effect a rotation of the frame counter-clockwise looking at the parts from the top, and a revolution of the frame in a clockwise direction looking at the parts from the outboard end, the rotation and revolution of the frame, i.e., from position C to position D in FIG. 1, both occurring simultaneously and being of a magnitude of 90°.

This rotation of the frame turns its lengthwise dimension at right angles to its direction of travel under the influence of the conveyor 11. As the frame is thus rotated, a pair of arms 131, 132 located at each corner thereof are simultaneously turned from an inactive position (FIGS. 10, 11, and 13) to an active position (FIG. 14) in which each pair of arms engages the crib sheet blank W closely adjacent a corner of the frame 10, one arm of each pair cooperating with a different intersecting panel 86 at said corner so that the marginal side and end pieces of the crib sheet are held closely together at the corner for cutting and sewing together.

Since all pairs of arms 131, 132 located at the corners of the crib sheet frame are the same, it will be necessary to describe only one. The arms in their inactive positions extend outwardly away from the crib sheet frame in a position below the lower edge of the hinged flaps 86 so as not to interfere with the flaps during their movement to raised positions. However, when the flaps have been restored to their normal positions with a marginal portion of crib sheet blank in contact with the surface thereof (FIG. 14) and the crib sheet frame rotated, the arms are swung up into a position where the flat outer portions thereof engage one, the adjacent marginal side portion W–2 and the other, the adjacent marginal end portion W–3 at the corner of the folded crib sheet blank to smooth such marginal portions out preparatory to the sewing operation. It will be noted from FIG. 24 that the arm 131 associated with the side flap of the frame in its active position extends for a relatively short distance beyond the end of the frame as at 133 whereas the arm 132 associated with the end flap of the frame is bent to form a lip or flange 134 which, in the active position of such arm, is in a plane parallel to the extended portion 133 of the associated side arm 131. Thus, when the frame 10 is in a position with its lengthwise dimension transverse to the direction of travel and its top vertically disposed, both corner edges of the frame at the outboard end thereof will be horizontal and the arms at such corners will tend to hold the material of adjacent marginal side and end panels W–2, W–3 closely together in a horizontal plane to facilitate first the removal of excess portions W–1 at the corners and then the sewing of a seam at such corners to connect the marginal side and end panels W–2, W–3 together (FIGS. 29, 30, and 31).

The arms 131, 132 at each corner of the machine are mounted respectively on shafts 135, 136 whose axes are disposed in a plane below and parallel with the base frame 77 of the machine. The shafts are disposed for rotation in bearings presented by a bracket 137 fixed to the base frame on the under side thereof. They diverge as they extend outwardly from their bearings at an angle somewhat less than 90° and converge as they extend inwardly from the bearings to a position where a pair of intermeshing beveled gears 138, 139 are fixed one on each of the shafts at their inner ends.

Each shaft 135, 136 is formed at its outer end to present a surface disposed at a bevel to its axis and it is the beveled surface of the shaft that engages the inner face of the arm 131, 132 secured to it. The arrangement is such that when an arm 131, 132 is in its active position, presenting a flat surface parallel to the face of the adjacently disposed flap 86 in normal lowered position, the beveled surface of its shaft 135, 136 is likewise in a plane parallel to the flap (FIG. 24). However, when the shaft is rotated through an angle of say 180°, the beveled surface at the end of the shaft will assume a reverse position wherein the arm 131, 132 thereof extends outwardly away from the flap 86 so as to present no interference to the latter when it is moved to its raised position (FIGS. 10, 11, 18, and 19).

As previously stated, the shafts 135, 136 associated with a pair of arms 131, 132 at any given corner are interconnected by beveled gears 138, 139 so that their rotation is simultaneous. The rotation of the arms at all corners of the frame is likewise rendered simultaneous by interconnecting the laterally extending shafts 135 at the same end corners for conjoint rotation through the medium of a transverse bar 140 journaled for rotation is a bearing 141 fixed to the base casting 77 on the under face thereof and which is connected to the laterally extending shafts 135 at their inner opposed ends, by universal joints 142 (FIGS. 19, 20, 24, and 28). There is a rotatable bar 140 at each end of the crib sheet frame and each bar is equipped with a pinion 143, 144 constrained to mesh with the teeth of a rack bar section 145, 146 disposed one at each end of a long bar 147 extending longitudinally of the frame and which is guided for limited movement in a longitudinal direction in guideways disposed at its opposite ends in the vicinity of the rack bar sections. The guideway at one end of the long bar is formed by a plate 148 secured to the bottom portion of the bearing bracket 141 which rotatably supports the transverse rod 140 so as to hold the rack in engagement with the pinion on its under side (FIG. 19), whereas at the other end of the frame the longitudinal bar 147 is bent upwardly so as to locate the rack bar 145 at that end above the pinion; contact of this last mentioned rack bar with the pinion being maintained by its engagement with the overlying surface of the base casting 77 (FIG. 20). By causing the rack bars 145, 146 to engage one at the top of the pinion 143 at one end of the frame and the other at the bottom of the pinion 144 at the opposite end of the frame, rotation of the bars 140 at such ends of the frame in opposite direction is obtained by a single movement of the long bar 147. Movement of the arms 131, 132 at the opposite ends of the frame to their active positions requires rotation of the shafts 140 on which they are mounted in opposite directions and a reversal in their respective directions of rotation to restore the arms to their inactive positions.

Longitudinal movement of the long bar 147 to effect movement of the arms 131, 132 to active position in which they hold the marginal side and end panels of the crib sheet blank close against the respective flaps of the frame is effected after the flaps 86 have been moved to their lowermost positions and during the first rotation of the frame 10 about the axis of the post 60 on which it is mounted. For this purpose, there is fixed on top of the bevel gear housing 49 and just below the crib sheet frame itself, a relatively large edge cam 149 which for the most part is circular in configuration but which has a depression or recess 150 extending over a relatively small section of its periphery (FIGS. 18 and 19). In the normal position of the parts, i.e., when the long dimension of the frame is disposed in the direction of its linear travel and when the fabric holding arms 131, 132 are in their inactive positions, an antifriction cam follower 151 is located in the recess of the cam. The antifriction cam follower is mounted at the end of a bar 152 whose opposite end is fixed about midway between the ends of a horizontal bar 153 fulcrumed at one end to the crib sheet frame 77 on the bottom side thereof and whose other end is pivotally connected to the long bar 147 which operates the crib sheet holding arms 131, 132. As the crib sheet frame begins to rotate in a counter-clockwise direction looking at the parts from the top, the antifriction cam follower 151 rides up relatively fast on to the high portion of the edge cam 149, with the result that the long bar 147 is moved to the right from the position shown in FIG. 19 to the position shown in FIG. 28, thereby to rotate the rod 140 at the left in counter-clockwise direction and the rod 140 at the right in a clockwise direction looking at the outboard side of the frame, to actuate the arms 131, 132 from inactive to active positions. This occurs in the initial stages of the first 90° of rotation from normal position and so that the crib sheet blank is held in position as the frame revolves around its supporting arm 41 from horizontal to vertical position, i.e., from position C to position D in FIG. 1.

At the same time that the holding arms 131, 132 swing up to active position, indeed, by operation of part of the same mechanism, the tongues 88 which during the time the fabric is deposited on the frame are in extended position (FIG. 25), move from such extended position to a retracted position so as not to interfere with the operation of the arms 131, 132 as they move toward close adjacency at the corners of the frame (FIG. 28). For this purpose, the tongue 88, relatively close to its pivotal support and adjacent its inner edge, has a pivotal connection with a short horizontal link 154 which extends for a short distance within the crib sheet frame at a angle of 45° with the side and end frame members or what is the same thing in the plane of the tongue as it swings between its extended and retracted position.

The link 154 is supported in its horizontal position at one end by its connection with the tongue 88 and about midway of its length, where it passes through a hole 155 disposed near the upper end of a substantially vertically extending arm 156 which is fixed at its lower end for limited rocking movement on a short horizontal rock shaft 157 jounraled in a bracket 158 supported by the crib sheet frame 10 (FIGS. 18, 25, and 27). The link 154 is encircled by a pair of compression springs 159, 160 in endwise alignment, and buttressed at their outer ends by collars 161 fixed on the link. The link floats between the inner ends of the springs 159, 160 so that the movement of the rock arm 156, regardless of its direction, is imparted to the link and hence to the tongue 88 through spring tension. The small rock shaft 157 on its end thereof opposite the arm 156 carries a bevel gear 162 arranged to mesh with another bevel gear 163 fixed on a transversely extending shaft 164 which is journaled at its opposite ends in bearings 165 fixed in the side frame members 80 of the crib sheet base frame 77 close to the top edge thereof. A crank arm 166 fixed on the transverse shaft 164 extends inwardly of the crib sheet frame for pivotal connection near the top of a vertically disposed link 167 which has a pivotal connection at its lower end with a crank arm 168 fixed on the transverse shaft 140 through which the corner fabric holding arms 131, 132 are operated.

According to this arrangement, when the long bar 147 is moved upon initiation of rotation of the crib sheet frame to turn the arms 131, 132 at the corners of the frame from inactive to active positions, rotation of the arm operating shaft 140 causes simultaneous rotation of the shaft 164 through which the corner tongue members 8 are operated. The initial rotation of the latter shaft 164 first relieves the tension on the spring 159 which urges the tongue to its outermost position and thereafter, as rotation of the shaft continues, a tightening of the spring 160 nearest the other end of the tongue rod 154 to retract the tongue 88 to its innermost position. The arms 131, 132 remain in their active positions and the tongues 88 in their retracted positions until after sewing of the crib sheet has been completed.

The crib sheet frame 10, with one of its ends in the outboard position and its top member 82 vertically disposed and facing in the direction of travel (position D in FIG. 1), advances under the influence of the conveyor 11, first to a fabric trimming station where the excess material W-1 at the two outboard corners of the crib sheet blank W are severed and then to a sewing station where the sheet is sewed at the same two corners (FIGS. 29, 30 and 31). The stations are represented diagrammatically at S (FIG. 7). In the advance of the frame 10 toward these stations, jets of air from a pair of fixed nozzles 169 (one only is shown) are directed from below against both of the dangling corner sections W-1 of material at the outboard end to insure that they will override horizontal bars 170 fixed in the machine frame and located parallel to the linear travel of the crib sheet frame. The bars 170 are spaced in a vertical direction to cooperate one with each of the outboard frame corners and they serve to hold the dangling sections W-1 in position to facilitate their severance. Once these stations over-ride the parallel bars, downwardly directed jets of air 171 (one only is shown) will insure that the excess material dangles downwardly over the bars 170. Severing of the material at the upper and lower corners takes place simultaneously and the severed pieces withdrawn from the severing area through a vacuum chute 172 (FIGS. 4 and 29). After the severing operation, the frame 10 continues to a pair of sewing heads where sewing occurs simultaneously at the upper and lower corners with any suitable stitch 173 appropriate for the purpose (FIG. 31). The details of the severing devices and the sewing devices form no part of the present invention and, accordingly, will not be discussed in detail. Reference may be had to the co-pending application previously mentioned if description of these parts is desired. During the travel of the frame past the severing and sewing stations, its stability may be enhanced by a bar 174 fixed at and extending outwardly from the side of the crib sheet frame near the bottom thereof and which rides in a first fixed guideway 175 presented by two closely spaced parallel and horizontal bars 176, 177 supported in a fixed position below the frame as it travels in its transverse vertical disposition past the severing and sewing heads.

The crib sheet frame 10 is then reversed end for end so that all of the functions performed in the severing and sewing operations at the first end of the frame may be repeated at the other end. This frame reversal end for end is accomplished by rotating the frame about the axis of its center supporting post 60 and this is accomplished by causing the star wheel 73 associated with the inner shaft and which is geared to the center supporting post to encounter in succession two overlying Y-shaped slots 69a, to which reference has previously been made and which together will rotate the frame through an angle of 180°—in manner previously described, from position D to position E to position F (FIG. 1). The excess material W-1 dangling at the corners of the frame which now are at the outboard end are presented as before at a second set of severing and sewing stations S-1. The steadying bar 174 will have traveled past the first fixed guideway 175 in which it rides so as not to interfere with the reversal of the frame as just described; but prior to presentation of the frame to the second series of severing and sewing stations S-1, a similar laterally extending bar 174 at the opposite side of the crib sheet frame will cooperate with a second guideway 178 similar to that previously described After completion of the second sewing operation, the conveyor 11 moves the frame 10 around the end of the machine and starts it back up the side thereof opposite that where the sewing operations take place. Near the beginning of its return travel, the star wheels 64, 73 associated with both the outer rotatable sleeve 46 and the inner rotatable shaft 58 encounter, respectively, an underlying Y-slot 69 and an overlying Y-slot 69a associated with the conveyor guideway 23 (FIGS. 1, 9, 16, and 17). Rotation of the outer sleeve 46 causes the crib sheet frame to revolve around its supporting arm through another 90° so that now the top of the frame faces downwardly. At the same time, rotation of the inner rotatable shaft 58 rotates the frame through another 90° so that the lengthwise direction of the frame again lies in the direction of its linear travel under the influence of the conveyor. The combined revolution and rotation of the frame takes it from location G to location H (FIG. 1). As the frame completes this last increment of rotation of 90°, it arrives back in its initial position insofar as rotation is concerned; but just as it does so, the antifriction roller 151 which controls the movement of the long bar 147 on the crib sheet frame and, consequently, the movement of the holding arms 131, 132 and the corner tongues 88, rides down into the recessed portion 150 of the edge cam 149 fixed atop the gear housing 49 (FIG. 18). The follower 151 is caused positively to ride down into the depression of the edge cam 150 by a second edge cam 179 which likewise is fixed on the gear housing 49 in the same plane as the first edge cam but on the outboard side of the follower. The fabric holding arms 131, 132 start to move away from the frame to release the fabric as the cam follower starts its descent into the recess in the edge cam and as soon as the fabric has been released by the arms the completed crib sheet falls off the frame under the influence of gravity (FIG. 32). The complete descent of the cam follower 151 into the recess 150 in the cam 149 completes the restoration of the fabric holding arms back to their normal position. At the same time, the tongues 88 at the corners of the frame are moved to their extended positions. But here again, while the tongues 88 are forced outwardly under spring tension, as previously described, this action of the springs is not effective until the last half of the inward travel of the cam which is sufficiently gradual to permit the preformed sheet to drop completely off the frame before the tongues are extended. In this connection, it should be noted that the grip of the fingers 114 which initially engage the edges of the crib sheet blank to cause the portions adjacent such edges to fold downwardly with the flaps 86, is not great enough to prevent the sheet from dropping off the frame.

As the crib sheet drops off the frame, it may be received upon a traveling belt 180 for removal to some other place for further processing.

There remains after the crib sheet has dropped off the frame only restoration of the frame to its normal position, and this now requires only a revolution of the frame about its supporting arm 41 through a distance of 180°. This is accomplished by causing the star wheel 64 associated with the outer sleeve 46 to encounter in succession two Y-shaped slots 69. Such encounter will cause the frame to revolve through two increments of 90°—i.e., from position H to position I and from position I to position J. This movement of the frame restores it to the position in which its top faces upwardly. And, since as previously stated, the frame has already been rotated back to its initial position, its condition at position J is the same as at position A in which all parts of the frame are normal, ready to pass around to position B where a crib sheet blank is deposited on the frame for a repetition of the machine cycle.

The various mechanisms of the machine may be driven from a single source of power and to this end the electric motor 36 which drives the conveyor may also be used to drive the apparatus 95 from which the crib sheet blank is deposited on to the frame and for driving the severing and the sewing devices. Power for apparatus 95 may be taken off intermediate shaft 31 through suitable chain and sprocket connections, and power for the severing and sewing devices through reduction gear 181 and through a transverse shaft 182 which it drives (FIG. 7). The operation of the severing and sewing devices, of course, will occur in appropriate time phase with the conveyance of the frame past the severing and the sewing heads; but since these controls have no bearing upon the invention with which we are here concerned, details of their construction and operation have not been given.

A crib sheet turned inside out with corners sewed up as it comes from the machine is illustrated in FIG. 2, and in FIG. 3 there is an enlarged view of a corner of the sheet to illustrate the sewed area. A finished crib sheet right side out is shown in FIG. 5. It includes a gusset W-1 at each of the corners interconnecting the free edges of the marginal side and end panel members W-2, W-3. Preferably the corner elements W-1 that are severed from the crib sheet blank during operation of the improved machine and method, may be used for the gussets so that no waste of material is involved. The corner of a completed sheet right side out and with the stitching used to hold the gussets in place is shown in FIG. 6.

Effort has been made in describing the construction of the various parts to include a description of their function also, so that operation of the machine and the method are believed clear without further elucidation. The invention has been described in connection with one embodiment thereof, but many other embodiments thereof are included within its spirit. For instance, the principles of this invention can be used to make a rectangular structure similar to a fitted crib sheet from a length of flexible plastic material which may be heat sealed at the corners instead of sewn. Other variations of this type will suggest themselves to one skilled in the art. The invention is to be limited, therefore, only by the claims hereto appended.

What is claimed is:

1. Apparatus suitable for making a box type product having a base panel of sheet material with marginal side and end panels folded up from the base panel and joined together into a box corner where the folded up side and end panels meet, said apparatus comprising a frame presenting a flat top, flaps having inner and outer faces hinged at one edge to the peripheral edge of the frame at said top to facilitate movement of the flaps between a raised position and a lowered position with respect to said top and in which the inner faces of the flaps are nearest said frame, sheet grasping devices associated with said flaps and movable to an inactive position as the flaps are raised and toward the outer faces of said flaps to an active sheet grasping position for holding a sheet material in contact with the outer faces of said flaps as the flaps are lowered, and means for raising and lowering said flaps.

2. Apparatus suitable for making a box type product having a base panel of sheet material with marginal side and end panels folded up from the base panel and joined together into a box corner where the folded up side and end panels meet, said apparatus comprising a frame presenting a flat top, flaps having inner and outer faces hinged at one edge to the peripheral edge of the frame at said top to facilitate movement of the flaps between a raised position and a lowered position with respect to said top and in which the inner faces of the flaps are nearest said frame, said frame with the flaps in raised position being adapted to support a blank of sheet material on said top with its marginal side and end panels supported by said flaps on the outer faces thereof, and said flaps being adapted when moved to lowered position with said side and end panels held in contact therewith to present said side and end panels together along a line of intersection, arm devices supported by the frame and movable when the flaps are lowered from an inactive to an active position for holding said side and end panels together along said line of intersection, and mechanism comprising devices carried by said frame for raising and lowering said flaps, and for rendering the arms active after lowering the flaps and inactive before raising said flaps.

3. Apparatus suitable for making a box type product having a base panel of sheet material with marginal side and end panels folded up from the base panel and joined together into a box corner where the folded up side and end panels meet, said apparatus comprising a frame presenting a flat top, flaps hinged at one edge to the peripheral edge of the frame at said top to facilitate movement of the flaps between a raised and lowered position with respect to said top, said frame with the flaps in raised position being adapted to support a blank of sheet material on said top with its marginal side and end panels supported on said flaps, and said flaps being adapted when moved to lowered position with said side and end panels held in contact therewith to present said side and end panels together along a line of intersection, a tongue supported on said frame for movement from an active position in which excess material between the side and end panels of a blank supported on the frame is held extended from said line of intersection, to an inactive position wherein said excess material is not so extended, arm devices movable when the flaps are lowered from an inactive to an active position for holding said side and end panels together along said line of intersection, and mechanism comprising devices carried by said frame for raising and lowering said flaps, and for rendering the arms active and the tongues inactive after lowering the flaps and the arms inactive and the tongues active before raising said flaps.

4. Apparatus suitable for making a product such as a crib sheet having a base panel of sheet material with marginal side and end panels folded up from the base panel and joined together into a box corner where the folded up side and end panels meet, said apparatus comprising a frame presenting a flat top, flaps hinged at one edge to the peripheral edge of the frame at said top to facilitate movement of the flaps between a raised and a lowered position with respect to said top, fingers hinged to said flaps at their opposite ends, connections for moving the fingers to an inoperative position when the flaps are raised and to an operative position when the flaps are lowered, mechanism including devices carried by said frame for raising and lowering said flaps, a conveyor for the frame, and means operable as the frame is conveyed into and out of a given position to actuate said mechanism respectively to raise and lower said flaps.

5. Apparatus suitable for making a product such as a crib sheet having a base panel of sheet material with marginal side and end panels folded up from the base panel and joined together into a box corner where the folded up side and end panels meet, said apparatus comprising a frame presenting a flat top adapted to receive and support a blank of material from which the crib sheet is to be made, a conveyor for the frame including a post fixed perpendicular to the flat top of the frame and about whose longitudinal axis the frame is rotatable and an arm supporting said post and about whose longitudinal axis said frame is revolvable, and means operable as said frame is conveyed from one location to another to rotate said frame about the longitudinal axis of its associated perpendicular post and to revolve said frame about the longitudinal axis of its supporting arm.

6. Apparatus suitable for making a product such as a crib sheet having a base panel of sheet material with marginal side and end panels folded up from the base panel and joined together into a box corner where the folded up side and end panels meet, said apparatus comprising a frame presenting a flat top, flaps hinged at one edge to the peripheral edge of the frame at said top to facilitate movement of the flaps between a raised and a lowered position with respect to said top, a conveyor for the frame including a post fixed perpendicular to the flat top of the frame and about whose longitudinal axis the frame is rotatable and an arm supporting said post, means for moving said arm in a closed path to transport the frame from one location to another, devices operable as said frame is conveyed from one location to another to rotate said frame about the longitudinal axis of the post on which it is fixed, sheet material holding arms carried by the frame having an active position holding the sheet material against the flaps when the flaps are in lowered position and an inactive position permitting movement of the flaps to raised position, and mechanisms operable as the frame is conveyed from one position to another to raise and lower said flaps, and, as the frame is rotated, to render the sheet material holding arms active and inactive.

7. Apparatus suitable for making a product such as a crib sheet having a base panel of sheet material with marginal side and end panels folded up from the base panel and joined together into a box corner where the folded up side and end panels of fabric meet, said apparatus comprising a frame presenting a flat top, flaps hinged at one edge to the peripheral edge of the frame at said top to facilitate movement of the flaps between a raised and a lowered position with respect to said top, fingers hinged to said flaps at their opposite ends, connections for moving the fingers to an inoperative position when the flaps are raised and to an operative position when the flaps are lowered, a tongue pivotally mounted at the corner of the frame and movable from an extended position adapted to hold the extended corner of a sheet resting on the frame, to a retracted position within the confines of the flaps in the lowered position of the latter, a conveyor for the frame including a post fixed perpendicular to the flat top of the frame and about whose longitudinal axis the frame is rotatable, devices operable as said frame is conveyed from one position to another to raise and lower the flaps, and other devices operable by the rotation of the frame to move the tongue to its retracted position.

8. Apparatus suitable for making a product such as a crib sheet having a base panel of sheet material with marginal side and end panels folded up from the base panel and joined together into a box corner where the folded up side and end panels meet, said apparatus comprising a frame presenting a flat top, flaps hinged at one edge to the peripheral edge of the frame at said top to facilitate movement of the flaps between a raised and a lowered position with respect to said top, fingers hinged to said flaps at their opposite ends, a tongue pivotally mounted at a corner of the frame and movable from an extended position adapted to hold extended the corner of a sheet resting on the frame, to a retracted position within the confines of the flaps in the lowered position of the latter, sheet material holding arms carried by the frame having an active position holding the sheet material against the flaps when the flaps are in lowered position and an inactive position permitting movement of the flaps to raised position, a conveyor for the frame including a post fixed perpendicular to the flat top of the frame and about whose longitudinal axis the frame is rotatable, means operable as the frame is conveyed from one position to another to raise and lower said flaps, and devices operable by the rotation of the frame after the flaps have been lowered to render the sheet material holding arms active and to move the tongue to its retracted position.

9. Apparatus suitable for making a product such as a crib sheet having a base panel of sheet material with marginal side and end panels folded up from the base panel and joined together into a box corner where the folded up side and end panels meet, said apparatus comprising a frame presenting a flat top, flaps hinged at one edge to the peripheral edge of the frame at said top to facilitate movement of the flaps between a raised and a lowered position with respect to said top, fingers hinged to said flaps at their opposite ends, a tongue pivotally mounted at a corner of the frame and movable from an extended position adapted to hold extended the corner of a sheet resting on the frame, to a retracted position within the confines of the flaps in the lowered position of the latter, sheet material holding arms carried by the frame having an active position holding the sheet material against the flaps when the flaps are in lowered position and an inactive position permitting movement of the flaps to raised position, a conveyor for the frame including a post fixed perpendicular to the flat top of the frame and about whose longitudinal axis the frame is rotatable, means operable as the frame is conveyed from one position to another to raise and lower said flaps, and common devices operable by the rotation of the frame after the flaps have been lowered to render the fabric holding arms active and to move the tongue to its retracted position.

10. Apparatus suitable for making a product such as a crib sheet having a base panel of sheet material with marginal side and end panels folded up from the base panel and joined together into a box corner where the folded up side and end panels meet, said apparatus comprising a frame presenting a flat top, a support for the frame including a post fixed perpendicularly to the flat top of the frame and about whose longitudinal axis the frame is rotatable, and including also an arm carrying the post and about whose longitudinal axis the frame is revolvable, a conveyor for moving said support in a closed path, and devices cooperating with said conveyor at selected intervals during its movement to effect such rotation and revolution of said frame at predetermined intervals whereby a crib sheet blank supported by said frame is presented at different locations for the performance of a plurality of functions contributing to the manufacture of said sheet.

11. Apparatus suitable for making a product such as a crib sheet having a base panel of fabric with marginal side and end panels folded up from the base panel and joined together into a box corner where the folded up side and end panels meet, said apparatus comprising a frame presenting a flat top, a support for the frame including a horizontal rotatable sleeve and a relatively rotatable concentric shaft disposed therein, a post supported by said sleeve at right angles to said shaft and geared for rotation thereby, said post being fixed to the frame at right angles to the flat top thereof, a conveyor for moving said support in a closed path, and devices cooperating with said conveyor and operating at selected intervals during its movement independently to rotate said sleeve and said shaft, whereby to rotate the frame about the axis of its supporting posts and to revolve the frame about the axis of the supporting sleeve and present a crib sheet blank supported by said frame at a plurality of different locations for the performance of a plurality of functions contributing to the manufacture of said sheet.

References Cited in the file of this patent
UNITED STATES PATENTS

| | | |
|---|---|---|
| 1,387,093 | Barnes | Aug. 9, 1921 |
| 2,524,982 | Levitt | Oct. 10, 1950 |
| 2,612,646 | Sussman | Oct. 7, 1952 |
| 2,748,839 | Mednick | June 5, 1956 |
| 2,813,465 | Schmied | Nov. 19, 1957 |
| 2,887,022 | Lubersky | May 19, 1959 |
| 3,041,943 | Turner | July 3, 1962 |
| 3,101,653 | Burden | Aug. 27, 1963 |

UNITED STATES PATENT OFFICE
CERTIFICATE OF CORRECTION

Patent No. 3,160,080                            December 8, 1964

John Thomas Frydryk

It is hereby certified that error appears in the above numbered patent requiring correction and that the said Letters Patent should read as corrected below.

Column 2, line 42, for "rotateda" read -- rotated --; line 64, for "or" read -- of --; column 12, line 13, for "is" read -- in --; column 13, line 59, for "8" read -- 88 --; column 14, line 13, for "stations" read -- sections --.

Signed and sealed this 18th day of May 1965.

(SEAL)
Attest:

ERNEST W. SWIDER                                    EDWARD J. BRENNER
Attesting Officer                                        Commissioner of Patents